April 16, 1946.  D. M. LIGHT  2,398,749

SPRING GROUP

Filed Jan. 2, 1942

INVENTOR.
David M. Light
BY
ATTORNEY.

Patented Apr. 16, 1946

2,398,749

UNITED STATES PATENT OFFICE 2,398,749

SPRING GROUP

David M. Light, Chicago, Ill., assignor to American Steel Foundries, Chicago, Ill., a corporation of New Jersey Application January 2, 1942, Serial No. 425,401

31 Claims. (Cl. 267—9)

My invention relates to a spring group and more particularly to a combination arrangement of coil springs and friction device for use in railway freight car trucks wherein the friction device acts as snubbing means to dampen the oscillations of the coil springs.

The general object of my invention is to devise such a group wherein the parts will be relatively inexepnsive and arranged for maximum efficiency of manufacture and operation.

A specific object of my invention is to devise such a group, sometimes described as a ride control unit, wherein one or more coil springs may be associated with the friction device and the friction device may comprise friction shoes arranged for development of substantially constant friction after the parts have been worn.

Yet another object of my invention is to devise such a composite spring group as that described wherein the snubbing device may comprise a bottom follower with spaced walls each comprising diagonal portions, a top follower in the general form of a wedge with which may be associated an auxiliary spring and spring cap, and friction shoes having complementary surfaces for engagement with said diagonal portions and means in overlapping relationship with said spring cap by means of which said shoes may receive thrust from said auxiliary spring, thus bringing them into frictional engagement with said top follower and with said beforementioned diagonal friction walls.

In my novel arrangement the wedge-like top follower acts as a carrier for the friction shoes and as the device is placed in operation the auxiliary compression spring acts with substantially constant force against the friction shoes, thus bringing them into wedge engagement with the top follower and likewise into frictional engagement with the bottom follower.

Describing the structure in detail, my novel spring group arrangement may comprise a top spring plate 2, a bottom spring plate 4, said top spring plate being cut away at the inboard end thereof as at 6 to avoid possible interference with a supported load carrying member, both of said spring plates being formed with scallop-like inturned flanges 8, 8 of well known form, said flanges serving as positioning means for the interposed coil springs diagrammatically indicated at 10, 10. Both of the spring plates may be formed with projecting lugs 12, 12 of well known form.

Figure 1:
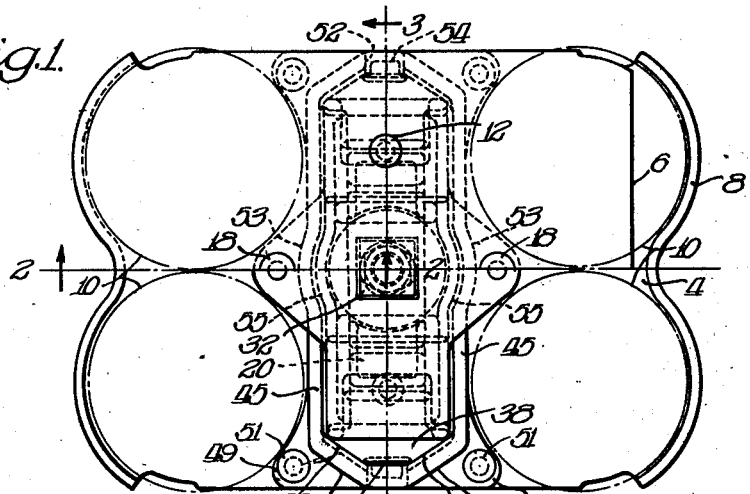
Figure 1 is a top plan of a spring group embodying my invention, the bottom half illustrating said group with the top spring plate removed.
Figure 2:
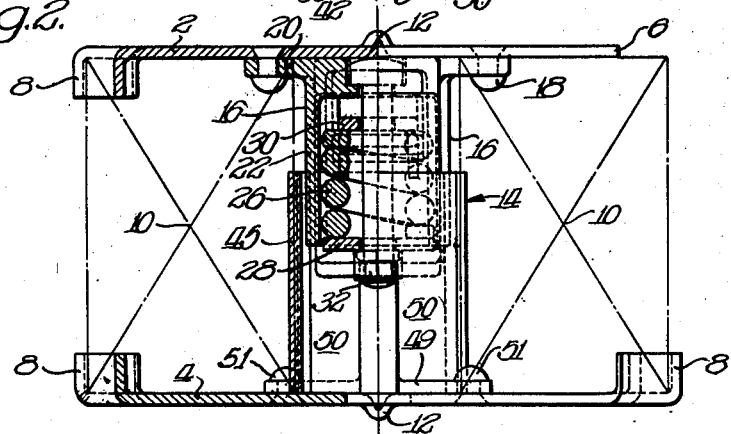
Figure 2 is a view in elevation taken from the bottom as seen in Figure 1, the left half thereof being in section, the section being taken substantially in the vertical plane bisecting the device as indicated by the line 2—2 of Figure 1.
Figure 3:
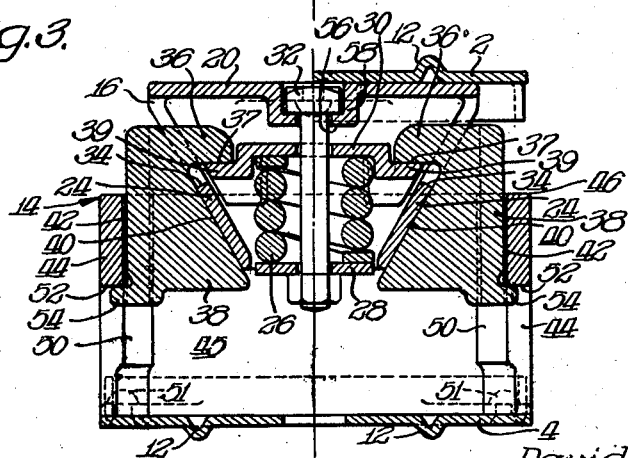
Figure 3 is a sectional view taken substantially in the transverse vertical plane bisecting the device approximately at right angles to the section shown in Figure 2 and as indicated by the line 3—3 of Figure 1.

Centrally positioned with respect to the coil springs 10, 10 may be my novel form of snubber or friction device generally designated 14, said device comprising a top follower 16 which may be centrally secured as at 18, 18 to the top spring plate 2. Said top follower is a hollow wedge-like structure having a top wall 20, lateral walls 22, 22, and diagonal end walls 24, 24 (Figure 3). Associated with the top follower 16 may be an auxiliary compression spring 26, said spring being confined in substantially complete compression between the bottom spring cap 28 and the top spring cap 30 and fixed with respect to said top follower by means of the securing bolt and nut assembly 32. Each end wall 24 of the top follower may be afforded a central vertical slot 34 within which may be received a horizontal lug 36 formed as an integral part of the adjacent friction shoe 38, said lug bearing as at 37 on the adjacent ledge 39 at the adjacent end of the spring cap 30. Each friction shoe 38 may have a wedge form and present a flat diagonal surface for abutment as at 40 with the adjacent end wall 24. Each shoe 38 may have a vertical end wall the central portion of which may have clearance as at 42 from the central portion of the adjacent end wall 44 of the bottom follower 46, the end walls of said bottom follower being generally complementary in form to the adjacent walls of the shoes 38, 38. The bottom follower 46 may be a box-like structure with lateral walls 45, 45 and the extremities of said follower may be flanged as at 49, 49 and secured as at 51, 51 to the bottom spring plate 4. The lateral walls 45, 45 of the bottom follower, as well as the lateral walls 22, 22 of the top follower may have arcuate configurations centrally thereof as best seen at 53 and 55 respectively (Figure 1) in order to conform to the contour of the compression spring 26 confined therebetween. The end wall of each shoe 38 has spaced diagonally arranged portions which may have frictional engagement as at 48, 48 (Figure 1) with the adjacent diagonally arranged portions 50, 50 of the end wall of the bottom follower 46 so that each friction shoe 38 has spaced diagonal face engagement with complementary faces on the associated end wall of the bottom follower and also abuts the top follower along a flat inner face at 40 so that each shoe is in wedge-like relation between the adjacent end walls of the respective followers. Each end wall 44 of the bottom follower may be centrally slotted as at 52 for reception of the lug 54 at the bottom extremity of the adjacent shoe, said lug 54 thus acting as a stop to limit the upward movement of said shoe with respect to the wall 44.

When the parts are dismantled it will be understood that the compression spring 26 which is carried on the top follower will be expanded so that the top spring cap 30 abuts as at 56 the lug 58 within which may be housed the head of the securing bolt 32. With the compression spring 26 thus expanded, the lugs 36, 36 of the friction shoes 38, 38 may be entered into the slots 34, 34 at opposite ends of the top follower and by means of a jig forced toward the bottom ends of said slots to a position which will permit the lugs 54, 54 to be inserted within the end walls 44, 44 after which the top follower and shoes may be forced downwardly until the lugs 54, 54 snap into position in the slots 52, 52.

It will be understood that after the parts have been assembled relatively little wear will take place along the surface at 40, the shift in position therealong resulting principally from wear which may develop along the surfaces 50, 50. At the same time, substantially constant friction will be developed along the diagonal surfaces 50, 50 on the end walls of the bottom follower by engagement of the friction shoes 38, 38 therewith at 48, 48.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a spring group, spaced spring plates, a coil spring and a snubber confined therebetween, said snubber having spaced followers secured respectively to said plates, one of said followers presenting spaced friction surfaces and the other of said followers having wedge means extending between said surfaces, friction shoes interposed between said wedge means and said surfaces respectively, means resiliently mounted on one of said followers urging said shoes into engagement with said wedge means and said surfaces, and lugs on each of said shoes slidably receivable in slots in the respective followers for interlocking engagement therewith.

2. In a spring group, top and bottom spring plates, a coil spring and a snubber confined therebetween, said snubber comprising top and bottom followers secured respectively to said plates, said bottom follower having friction surfaces at opposite ends thereof and said top follower presenting wedge faces spaced from said surfaces, friction shoes interposed between said surfaces and faces, each of said friction shoes having engagement with the adjacent friction surface along spaced areas with clearance therebetween, and means on said top follower urging each of said shoes into wedge engagement between the adjacent surface and face.

3. In a spring group, top and bottom spring plates, a coil spring and a snubber confined therebetween, said snubber having a follower presenting spaced friction surfaces and an opposed wedge follower, friction shoes at opposite ends of said snubber in abutment with said wedge follower and the adjacent surfaces respectively, means resiliently mounted on one of said followers operative to urge said friction shoes into engagement with the respective followers at substantially constant pressure throughout the stroke of said snubber, and means on each of said shoes in interlocking engagement with both of said followers.

4. A spring group comprising top and bottom spring plates, a coil spring and a friction device confined therebetween, said device comprising a follower presenting opposed friction walls with spaced angularly arranged friction faces, a wedge follower in reciprocating relation with said first-mentioned follower, friction shoes interposed between said followers, spaced relatively movable walls and a spring under compression therebetween and reacting thereagainst in said wedge follower, rigid means extending between said walls and connecting the same to said wedge follower, one of said walls engaging respective shoes for urging them into engagement with said followers.

5. In a spring group, spaced spring plates, a coil spring and a snubber confined therebetween, said snubber having opposed followers, one of which presents spaced vertical friction surfaces and the other of which has wedge means between said surfaces, a spring cap resiliently mounted on said last-mentioned follower, friction shoes urged by said cap into engagement between said wedge means and said surfaces respectively, and lugs on said shoes slidably received in slots in said first-mentioned follower for interlocking engagement therewith.

6. In a spring group, spaced spring plates, a coil spring and a snubber confined therebetween, said snubber having spaced followers secured respectively to said plates, one of said followers presenting spaced friction surfaces and the other of said followers having wedge means extending between said surfaces, friction shoes interposed between said wedge means and said surfaces respectively, means resiliently mounted on one of said followers urging said shoes into engagement with said wedge means and said surfaces, each of said friction surfaces presenting a plurality of flat faces angularly arranged with respect to each other, and means on each of said shoes in interlocking engagement with both of said followers.

7. In a spring group, top and bottom spring plates, a coil spring and a snubber confined therebetween, said snubber having a follower presenting spaced friction surfaces and an opposed wedge follower, friction shoes at opposite ends of said snubber in abutment with said wedge follower and the adjacent surfaces respectively, and means mounted in said wedge follower operative to urge said shoes into engagement with respective followers at substantially constant pressure throughout the stroke of said snubber, said means comprising spaced spring caps and a spring in compression therebetween and reacting thereagainst, said shoes having portions thereof extending within said wedge follower and in operative engagement with one of said caps.

8. In a spring group, top and bottom spring plates, a coil spring and a snubber confined therebetween, said snubber comprising top and bottom followers secured respectively to said plates, said bottom follower having friction surfaces at opposite ends thereof and said top follower presenting wedge faces spaced from said surfaces, and friction shoes interposed between said surfaces and faces, each of said friction shoes having engagement with the adjacent friction surface along spaced areas with clearance therebetween, said top follower supporting spaced spring plates with a compression spring therebetween, one of said spring plates having cooperative engagement with both of said shoes.

9. In a spring group, a top spring plate, a bottom spring plate, a coil spring and a snubber confined between said plates, said snubber having opposed followers one presenting spaced friction surfaces and the other having wedge means interposed between said surfaces, and friction shoes resiliently supported between said wedge means and said surfaces respectively, each of said surfaces engaging the adjacent shoe along spaced diagonally arranged faces and having intervening clearance therefrom, said wedge means comprising a compression spring and a spring cap supported thereon in operative engagement with both of said shoes.

10. In a spring group, a top spring plate, a bottom spring plate, a coil spring and a snubber confined between said plates, said snubber having opposed followers one presenting spaced friction surfaces and the other having wedge means interposed between said surfaces, friction shoes resiliently supported between said wedge means and said surfaces respectively, and lugs on each of said shoes slidably received in slots of the respective followers for interlocking engagement therewith.

11. In a spring group, top and bottom spring plates, a coil spring and a snubber confined therebetween, said snubber comprising spaced followers secured to said plates respectively, one of said followers having spaced friction surfaces and the other of said followers presenting composite wedge means therebetween, and friction shoes resiliently supported from said last-mentioned follower in engagement with said wedge means and said surfaces, said wedge means comprising a spring cap resiliently supported against said shoes for movement therewith.

12. In a spring group, spaced spring plates, a coil spring and a snubber confined therebetween, said snubber having opposed followers one of which presents spaced vertical friction surfaces and the other of which has wedge walls between said surfaces, spaced spring caps in said last-mentioned follower and means connecting said caps to the follower, a spring under compression between said caps, friction shoes between said wedge walls and said surfaces, each of said shoes having a lug extending within an opening of the adjacent wall for operative engagement with one of said caps.

13. In a spring group, top and bottom spring plates, a coil spring and a friction device interposed therebetween, said device having a friction follower with friction walls at opposite ends thereof, and a wedge follower resiliently supporting friction shoes for engagement with said walls, each of said friction shoes having lugs slidably received in slots of the respective followers for interlocking engagement therewith.

14. In a spring group, top and bottom spring plates, a coil spring and friction device interposed therebetween, said device having a friction follower with friction walls at opposite ends thereof and a wedge follower resiliently supporting friction shoes for engagement with said walls, each of said friction shoes engaging the adjacent wall on spaced diverging surfaces, spaced spring caps and a spring under compression therebetween and reacting thereagainst in said wedge follower, and means connecting said caps and said wedge follower, each of said shoes extending within the adjacent wall of said wedge follower and having engagement with one of said caps.

15. In a snubber, a friction follower having at opposite ends thereof friction walls, a wedge follower, and friction shoes resiliently supported from said wedge follower in frictional engagement with said walls respectively, each of said friction shoes having lugs slidably received in slots of respective followers for interlocking engagement therewith.

16. In a snubber, a follower having spaced friction walls, a wedge follower, spaced spring plates in said wedge follower and a spring under compression therebetween, means connecting said plates to one of said followers, and friction shoes engaged by one of said plates and urged thereby into engagement with said followers at opposite ends of said snubber.

17. In a snubber, a friction follower having at opposite ends thereof vertical V-shaped walls, a hollow wedge follower presenting diagonal friction faces in opposed relation to said walls, friction shoes between said walls and faces, a rigid member resiliently mounted in said wedge follower, each of said shoes having means projecting through openings in the adjacent faces for abutment with said rigid member whereby said shoes are urged into engagement with both of said followers.

18. A wedge follower assembly comprising a wedge member having diagonally arranged shoe engaging walls at opposite ends thereof and housing a plurality of spring plates with a compression spring therebetween, one of said spring plates presenting ledges in alignment with openings in said walls for engagement with associated friction shoes.

19. A friction device comprising a follower presenting opposed friction walls each with spaced angularly arranged friction faces, an opposed wedge follower assembly, and friction shoes interposed between said follower and said assembly, said assembly comprising a member housing spaced spring plates and a compression spring therebetween, one of said spring plates presenting abutment means aligned with openings in the adjacent walls of said member for engagement with respective shoes.

20. A friction device comprising a follower presenting opposed friction walls each with spaced angularly arranged friction faces, an opposed wedge follower assembly, and friction shoes interposed between said follower and said assembly, said assembly comprising a member housing spaced spring plates and a compression spring therebetween, one of said spring plates presenting abutment means aligned with openings in the adjacent walls of said member for engagement with respective shoes, each of said shoes having means interlocking with said follower and said assembly.

21. In a spring group, top and bottom spring plates, a plurality of coil springs therebetween, outer and inner telescoped followers secured to respective plates, spaced friction surfaces on each follower, spaced friction shoes each in engagement with a surface on each follower, an abutment member engaged with the upper ends of respective shoes, and a resilient member bearing against said abutment member and abutment means carried by one of said followers and operative to urge said shoes into engagement with said surfaces, said resilient member being disposed between the spaced surfaces of each follower.

22. In a spring group, top and bottom spring plates, a plurality of coil springs therebetween, outer and inner telescoped followers secured to respective plates, friction surfaces on each follower, the adjacent friction surfaces on respective followers vertically overlapping each other, friction shoes each in engagement with one surface on each follower, an abutment member engaged with said shoes, and a vertically disposed resilient member bearing against said member and abutment means carried by one of said followers and operative to urge said shoes into engagement with respective surfaces, said resilient member being disposed between the friction surfaces on each follower.

23. In a friction absorbing device, an inner follower having spaced friction walls presenting exterior friction surfaces, an outer follower telescoped over the inner follower and presenting interior friction faces adjacent respective surfaces, said followers affording seats for the device, friction shoes each frictionally engaging one face and one surface, an abutment member on said shoes, and resilient means disposed between said walls and bearing against said abutment member and abutment means associated with one of said followers to urge said shoes into said engagement.

24. In a friction absorbing device, an inner follower having spaced exterior friction surfaces, an outer follower telescoped over the inner follower and presenting interior friction faces adjacent respective surfaces, said followers affording seats for the device, friction shoes each frictionally engaging one face and one surface, an abutment member associated with said shoes, and resilient means within the inner follower between said surfaces and bearing against said abutment member and abutment means associated with one of said followers to urge said shoes into said engagement.

25. In a spring group, spaced spring plates, a coil spring therebetween, spaced followers secured to respective plates, spaced friction surfaces on each follower, friction shoes each engaging an interior surface on one follower and an exterior surface on the other follower, a plate in said other follower bearing against said shoes, and resilient means bearing against said plate and abutment means associated with one of said followers for urging said shoes into engagement with the associated surfaces.

26. In a friction device, spaced inner and outer housings disposed in telescopic relationship, friction surfaces on each housing, a plurality of friction shoes each engaging a surface on each housing, a member within the inner housing and bearing against said shoes, and resilient means extending within the inner housing and bearing against said member and abutment means associated with one of said housings for urging the shoes into engagement with the associated friction surfaces.

27. In a friction absorbing device, an inner follower having spaced friction walls presenting external friction surfaces, an outer follower telescoped over the inner follower and presenting internal friction faces adjacent respective surfaces, said followers affording seats for the device against associated members, friction shoes each frictionally engaging one face and one surface, an abutment element bearing against said shoes, and resilient means between said walls and bearing against said element and abutment means associated with one of said followers to urge said shoes into said engagement.

28. In a friction absorbing device, spaced inner and outer followers presenting overlapping friction surfaces, said followers affording seats respectively for the top and bottom of the device, friction shoes engaged with said surfaces, abutment means on said shoes, and resilient means bearing against said abutment means and other abutment means on said inner follower to urge said shoes into said engagement, said resilient means and both abutment means being disposed within said inner follower.

29. In a friction absorbing device, an inner follower having spaced friction walls presenting exterior friction surfaces, an outer follower telescoped over the inner follower and presenting interior friction faces adjacent respective surfaces, said followers affording seats for the device, friction shoes each frictionally engaging one face and one surface, abutment means on said shoes, and resilient means extending between said walls and bearing against said abutment means and other abutment means on one of said followers to urge said shoes into said engagement.

30. In a friction absorbing device, spaced followers presenting overlapping friction surfaces, said followers affording seats respectively for the top and bottom of the device, a friction shoe engaged with said surfaces, abutment means on said shoe, and resilient means disposed at one side of said surfaces and bearing against said abutment means and other abutment means on one of said followers to urge said shoe into said engagement, said resilient means being housed within both followers.

31. In a spring group, spaced spring plates, a coil spring therebetween, spaced followers secured to respective plates, spaced friction surfaces on each follower, friction shoes each engaging an interior surface on one follower and an exterior surface on the other follower, a plate in said other follower bearing against said shoes, and resilient means bearing against said plate and abutment means on one of said followers for urging said shoes into engagement with the associated surfaces.

DAVID M. LIGHT.